United States Patent
Kwon et al.

(10) Patent No.: US 11,941,870 B1
(45) Date of Patent: Mar. 26, 2024

(54) SYSTEM FOR ACTION RECOGNITION ERROR DETECTION AND CORRECTION USING PROBABILISTIC SIGNAL TEMPORAL LOGIC

(71) Applicant: HRL Laboratories, LLC, Malibu, CA (US)

(72) Inventors: Hyukseong Kwon, Thousand Oaks, CA (US); Amit Agarwal, San Francisco, CA (US); Kevin Lee, Irvine, CA (US); Amir M. Rahimi, Santa Monica, CA (US); Alexie Pogue, Los Angeles, CA (US); Rajan Bhattacharyya, Sherman Oaks, CA (US)

(73) Assignee: HRL LABORATORIES, LLC, Malibu, CA (US)

(*) Notice: Subject to any disclaimer, the term of this patent is extended or adjusted under 35 U.S.C. 154(b) by 46 days.

(21) Appl. No.: 17/699,038

(22) Filed: Mar. 18, 2022

Related U.S. Application Data (63) Continuation-in-part of application No. 17/030,354, filed on Sep. 23, 2020, now Pat. No. 11,334,767.
(Continued)

(51) Int. Cl.
| | | |
|---|---|---|
| *G06K 9/00* | (2022.01) | |
| *B60W 60/00* | (2020.01) | |
| *G06V 10/72* | (2022.01) | |
| *G06V 10/774* | (2022.01) | |
| *G06V 10/776* | (2022.01) | |

(Continued)

(52) U.S. Cl.
CPC ....... *G06V 10/776* (2022.01); *B60W 60/0015* (2020.02); *G06V 10/72* (2022.01); *G06V 10/774* (2022.01); *G06V 20/41* (2022.01); *G06V 20/58* (2022.01); *G06V 20/70* (2022.01);
(Continued)

(58) Field of Classification Search
CPC .... G06V 10/776; G06V 10/72; G06V 10/774; G06V 20/41; G06V 20/58; G06V 20/70; B60W 60/0015; B60W 2420/42; B60W 2710/20; G08G 1/166
See application file for complete search history.

(56) References Cited

U.S. PATENT DOCUMENTS

| | | |
|---|---|---|
| 8,027,946 B1 | 9/2011 | Daily |
| 9,008,840 B1 | 4/2015 | Ponulak |

(Continued)

OTHER PUBLICATIONS

A. Dokhanchi, H.B. Amor, J.V. Deshmukh, and G. Fainekos, "Evaluating perception systems for autonomous vehicles using quality temporal logic," International Conference on Runtime Verification, 2018, pp. 409-416.

(Continued)

*Primary Examiner* — Howard D Brown, Jr.
(74) *Attorney, Agent, or Firm* — TOPE-MCKAY & ASSOCIATES (57) ABSTRACT

Described is a system for action recognition error detection and correction using probabilistic signal temporal logic. The system is initiated by training an action recognition system to generate true positive (TP)/false positive (FP) axioms. Thereafter, the system ca be used to classify one or more actions in a video sequence as true action classifications by using the TP/FP axioms to remove false action classifications. With the remaining true classifications, a device can be controlled given the situation and relevant true classification.

19 Claims, 10 Drawing Sheets

Related U.S. Application Data (60) Provisional application No. 63/190,066, filed on May 18, 2021, provisional application No. 62/984,713, filed on Mar. 3, 2020, provisional application No. 62/905,059, filed on Sep. 24, 2019.

(51) Int. Cl.
*G06V 20/40* (2022.01)
*G06V 20/58* (2022.01)
*G06V 20/70* (2022.01)
*G08G 1/16* (2006.01)

(52) U.S. Cl.
CPC ......... *G08G 1/166* (2013.01); *B60W 2420/42* (2013.01); *B60W 2710/20* (2013.01)

(56) References Cited

U.S. PATENT DOCUMENTS

| | | | |
|---|---|---|---|
| 9,626,591 | B2 | 4/2017 | Holz et al. |
| 10,699,419 | B2 | 6/2020 | Cui |
| 2011/0051992 | A1 | 3/2011 | Cobb |
| 2012/0188365 | A1 | 7/2012 | Stork |
| 2015/0378696 | A1 | 12/2015 | Boehm |
| 2016/0165193 | A1 | 6/2016 | Rasheed |
| 2017/0364831 | A1 | 12/2017 | Ghosh |
| 2018/0005118 | A1 | 1/2018 | Kapoor |
| 2019/0302439 | A1 | 10/2019 | Lyuboshenko |
| 2020/0036743 | A1 | 1/2020 | Almukaynizi |
| 2020/0111005 | A1* | 4/2020 | Ghosh ............ G06N 3/042 |
| 2020/0111012 | A1 | 4/2020 | Wan |
| 2020/0221009 | A1 | 7/2020 | Citerin |
| 2021/0011461 | A1 | 1/2021 | Fowler |
| 2021/0081751 | A1 | 3/2021 | Boss |
| 2021/0089837 | A1* | 3/2021 | Kwon ............ G06V 10/42 |

OTHER PUBLICATIONS

S. Jha, V. Raman, D. Sadigh, and S.A. Seshia, "Safe Autonomy Under Perception Uncertainty Using Chance-Constrained Temporal Logic," Journal of Automated Reasoning, 2018, 60, pp. 43-62.

Ji, Jingwei, et al. "Action Genome: Actions as Compositions of Spatio-Temporal Scene Graphs." Proceedings of the IEEE/CVF Conference on Computer Vision and Pattern Recognition. 2020, pp. 10233-10244.

Chao-Yuan Wu, Christoph Feichtenhofer, Haoqi Fan, Kaiming He, Philipp Krahenbuhl, and Ross Girshick. Long-term feature banks for detailed video understanding. In IEEE Conf. on CVPR, pp. 284-293, 2019.

Gunnar A. Sigurdsson, et al. "Hollywood in Homes: Crowdsourcing Data Collection for Activity Understanding." Proceedings of the IEEE/CVF European Conference on Computer Vision. 2016, pp. 510-526.

S. Wold, K. Esbensen and P. Geladi, "Principal Component Analysis," Chemometrics and Intelligent Systems, vol. 2, Issues 1-3, Aug. 1987, pp. 37-52.

Ji, Jingwei and Krishna, Ranjay and Fei-Fei, Li and Niebles, Juan Carlos, "Action Genome: Actions as Compositions of Spatio-Temporal Scene Graphs," Proceedings of the IEEE/CVF Conference on Computer Vision and Pattern Recognition, CVPR_2020, pp. 10236-10247.

A.M. Rahimi, et al., "Toward Improving the Visual Characterization of Sport Activities With Abstracted Scene Graphs," Proceedings of the IEEE/CVF Conference on Computer Vision and Pattern Recognition (CVPR) Workshops, 2021, pp. 4500-4507.

A. Dokhanchi, H. B. Amor, J.V. Deshmukh, and G. Fainekos, "Evaluating perception systems for autonomous vehicles using quality temporal logic," International Conference on Runtime Verification, 2018, pp. 1-7.

R.R. da Silva, V. Kurtz, and M. Hebert, "Active Perception and Control from Temporal Logic Specifications," arXiv:1905.03662, 2019, pp. 1-6.

S. Jha, V. Raman, D. Sadigh, and S.A. Seshia, "Safe Autonomy Under Perception Uncertainty Using Chance—Constrained Temporal Logic," Journal of Automated Reasoning, 2018, pp. 43-62.

D. Sadigh and A. Kapoor, "Safe control under uncertainty with Probabilistic Signal Temporal Logic," in Proc. of Robotics: Science and Systems, 2016, pp. 1-10.

Joseph Redmon, Santosh Divvala, Ross Girshick, Ali Farhadi; The IEEE Conference on Computer Vision and Pattern Recognition (CVPR), 2016, pp. 779-788.

N. Wojke, A. Bewley and D. Paulus, "Simple online and realtime tracking with a deep association metric," 2017 IEEE International Conference on Image Processing (ICIP), Beijing, 2017, pp. 3645-3649.

Yolo: Real-Time Object Detection, https://pjreddie.com/darknet/yolo/, downloaded Dec. 15, 2020.

Office Action 1 for U.S. Appl. No. 17/030,354, dated May 6, 2021.
Response to Office Action 1 for U.S. Appl. No. 17/030,354, dated Aug. 5, 2021.
Office Action 2 for U.S. Appl. No. 17/030,354, dated Sep. 8, 2021.
Response to Office Action 2 for U.S. Appl. No. 17/030,354, dated Dec. 8, 2021.
Notice of Allowance for U.S. Appl. No. 17/030,354, dated Jan. 25, 2022.

A. Dokhanchi, H. B. Amor, J.V. Deshmukh, and G. Fainekos, "Evaluating perception systems for autonomous vehicles using quality temporal logic," International Conference on Runtime Verification, pp. 409-416, 2018.

R.R. da Silva, V. Kurtz, and M. Hebert, "Active Perception and Control from Temporal Logic Specifications," arXiv:1905.03662, pp. 1-6, 2019.

S. Jha, V. Raman, D. Sadigh, and S.A. Seshia, "Safe Autonomy Under Perception Uncertainty Using Chance—Constrained Temporal Logic," Journal of Automated Reasoning, pp. 43-62, 2018.

D. Sadigh and A. Kapoor, "Safe control under uncertainty with Probabilistic Signal Temporal Logic, " in Proc. of Robotics: Science and Systems, pp. 1-10, 2016.

J. A. Stark, "Adaptive Image Contrast Enhancement Using Generalizations of Histogram Equalization," IEEE Transactions on Image Processing, vol. 9, No. 5, pp. 889-896, 2000.

V. Vonikakis, D. Chrysostomou, R. Kouskouridas and A. Gasteratos, "Improving the Robustness in Feature Detection by Local Contrast Enhancement," 2012 IEEE International Conference on Image Systems and Techniques Proceedings, pp. 1-6, Jul. 2012.

Yolo Real Time Object Detection, located at pjreddie.com/darknet/yolo/, pp. 1-7, taken on Aug. 12, 2020.

Luminance Contrast, found at colorusage.arc.nasa.gov/luminance_cont.php, pp. 1-7, taken on Dec. 2, 2020.

Multiple Object Tracking Benchmark, located at motchallenge.net, pp. 1-3, taken on Aug. 12, 2020.

Information Entropy Measure for Evaluation of Image Quality, Du-Yih Tsai, Yongbum Lee, Eri Matsuyama, J Digit Imaging. Sep. 2008; 21(3): pp. 338-347. Published online Jun. 19, 2007. doi: 10.1007/s10278-007-9044-5.

Notice of Allowance for U.S. Appl. No. 17/133,345, dated Feb. 7, 2022.

Notification of Transmittal and the International Search Report, and the Written Opinion of the International Searching Authority for PCT/US2020/052342; dated Feb. 2, 2021.

Yulong Wu, et al., "Active Control of Camera Parameters for Object Detection Algorithms", arxiv.org, Cornell University Library, 201. Olin Library Cornell Uni Versity Ithaca, NY, 14853, May 16, 2017 (May 16, 2017), XP080948249.

Balakrishnan Anand, et al., "Specifying and Evaluating Quality Metrics for Vision-based Perception Systems", 2019 Design, Automation & Test in Europe Conference & Exhibition (Date), EDAA, Mar. 25, 2019 (Mar. 25, 2019), pp. 1433-1438, XP033550188.

Tuncali Cumhur Erkan, et al., "Simulation-based Adversarial Test Generation for Autonomous Vehicles with Machine Learning Components", 2018 IEEE Intelligent Vehicles Symposium (IV), IEEE, Mar. 25, 2019 (Mar. 25, 2019), pp. 1555-1562, XP033423320.

Notification of Transmittal of the International Preliminary Report on Patentability (Chapter I) for PCT/US2020/052342; dated Apr. 7, 2022.

(56) References Cited

OTHER PUBLICATIONS

The International Preliminary Report on Patentability (Chapter I) for PCT/US2020/052342; dated Apr. 7, 2022.
The International Search Report and the Written Opinion of the International Searching Authority for PCT/US2020/066972; dated Apr. 16, 2021.
Wu, Y., et al., "Active Control of Camera Parameters for Object Detection Algorithms," ariv.org, Cornell University Library, NY, 2017, pp. 1-7.
Anand, B., et al., "Specifying and Evaluating Quality Mertics for Vision-based Perception Systems," 2019 Design, Automation & Test in Europe Conference & Exhibition, EDAA, pp. 1433-1438.
Erkan, T.C., et al., "Simulation-based Adversarial Test Generation for Autonomous Vehicles with Machine Learning Components," 2018 IEEE Intelligent Vehicles Symposium, pp. 1555-1562.
Notification of Transmittal and the International Preliminary Report on Patentability (Chapter II) for PCT/US2020/066972; dated Apr. 4, 2022.

\* cited by examiner

|  | Precision rate | | Recall rate | |
| --- | --- | --- | --- | --- |
|  | Original method | Adjusted method | Original method | Adjusted method |
| All 157 actions | 34.88% | 36.42% | 23.69% | 22.07% |
| Top 10 actions | 39.06% | 42.83% | 34.63% | 34.33% |
| Top 5 actions | 25.34% | 32.16% | 17.83% | 17.39% |

|  | Precision rate | | Recall rate | |
|---|---|---|---|---|
|  | Original method | Adjusted method | Original method | Adjusted method |
| All 157 actions | 33.77% | 34.46% | 20.46% | 19.04% |
| Top 10 actions | 21.26% | 25.22% | 10.34% | 9.70% |
| Top 5 actions | 25.72% | 29.83% | 11.69% | 11.36% |

SYSTEM FOR ACTION RECOGNITION ERROR DETECTION AND CORRECTION USING PROBABILISTIC SIGNAL TEMPORAL LOGIC

CROSS-REFERENCE TO RELATED APPLICATIONS

This is a Continuation-in-Part application of U.S. application Ser. No. 17/030,354, filed on Sep. 23, 2020, which is a non-provisional patent application of U.S. Provisional Application No. 62/905,059, filed on Sep. 24, 2019 and of U.S. Provisional Application No. 62/984,713, filed on Mar. 3, 2020, the entirety of which are hereby incorporated by reference.

The present application is ALSO a non-provisional application of U.S. Provisional Application No. 63/190,066, filed on May 18, 2021, the entirety of which is hereby incorporated by reference.

BACKGROUND OF INVENTION

(1) Field of Invention

The present invention relates to an action recognition system and, more specifically, to a system for action recognition error detection and correction using probabilistic signal temporal logic.

(2) Description of Related Art

In autonomous driving or navigation systems, a great number of wrong detections and recognitions threaten the safe and robust performance of fully autonomous systems. Perception errors are a challenging issue despite performance improvements in perception systems in the last decade. In order to describe perception errors and recover from them, there have been a number of research directions, especially with formally verifying the systems using temporal logic (see the List of Incorporated Literature References, Reference Nos. 1, 2, 3, 4). Most of the existing systems plan to control the autonomous systems themselves rather than fix the perception systems.

Regarding action recognition, there have been research and outputs using objects and the corresponding relations (see Literature Reference Nos. 6 and 7). Other work has focused on improving the processing efficiency through semantic abstraction (see Literature Reference No. 8). In these action recognition methods, there are no appropriate mechanisms for removing false positive recognitions or correct wrong action detections.

Thus, a continuing need exists for a system that provides a unique solution for improving the precision rates by removing false recognitions with help of a probabilistic signal temporal logic (PSTL) framework.

SUMMARY OF INVENTION

The present disclosure is directed to a system for action recognition error detection and correction. In one aspect, the system includes one or more processors and a memory. The memory is a non-transitory computer-readable medium having executable instructions encoded thereon, such that upon execution of the instructions, the one or more processors perform several operations, such as those listed below and herein. For example, the processor(s) perform operations of training an action recognition system to generate true positive (TP)/false positive (FP) axioms; classifying one or more actions in a video sequence as true action classifications by using the TP/FP axioms to remove false action classifications; and controlling a device based on the true action classifications.

In another aspect, training the action recognition system further comprises operations of receiving a training video sequence; generating object action labels from object actions within the training video sequence; evaluating the object action labels using ground truth action labels to generate TP/FP statistics; converting the TP/FP statistics into probabilistic signal temporal logic (PTSL) based axioms; and generating the TP/FP axioms from the PTSL based axioms.

In yet another aspect, classifying one or more actions in the video sequence as true action classifications further comprises operations of receiving a video sequence; generating a set of action labels from the video sequence; evaluating the set of action labels based on the TP/FP axioms to identify false positive action labels; removing the false positive action labels from the set of action labels, leaving true action classifications.

In another aspect, controlling the device based on the true action classifications includes causing an autonomous vehicle to initiate a maneuver to avoid a collision with an object. For example, the physical maneuver to avoid a collision with an object includes causing the autonomous vehicle to steer (or brake) to avoid the collision.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present disclosure is directed to a system for action recognition error detection and correction using probabilistic signal temporal logic. The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112(f). In particular, the use of "step of" or "act of" in the claims herein is not intended to invoke the provisions of 35 U.S.C. 112(f).

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. A. Dokhanchi, H. B. Amor, J. V. Deshmukh, and G. Fainekos, "Evaluating perception systems for autonomous vehicles using quality temporal logic," International Conference on Runtime Verification, 2018.
2. R. R. da Silva, V. Kurtz, and M. Hebert, "Active Perception and Control from Temporal Logic Specifications," arXiv:1905.03662, 2019.
3. S. Jha, V. Raman, D. Sadigh, and S. A. Seshia, "Safe Autonomy Under Perception Uncertainty Using Chance-Constrained Temporal Logic," Journal of Automated Reasoning, 2018.
4. D. Sadigh and A. Kapoor, "Safe control under uncertainty with Probabilistic Signal Temporal Logic," in Proc. Of Robotics: Science and Systems, 2016.
5. H. Kwon, A. M. Rahimi, A. Agarwal and R, Bhattacharyya, "System and Method of Perception Error Evaluation and Correction by Solving Optimization Problems under the Probabilistic Signal Temporal Logic Based Constraints," U.S. Patent Publication No. 2021/0089837, Mar. 25, 2021.
6. Ji, Jingwei, et al. "Action Genome: Actions as Compositions of Spatio-Temporal Scene Graphs." *Proceedings of the IEEE/CVF Conference on Computer Vision and Pattern Recognition.* 2020.
7. Chao-Yuan Wu, Christoph Feichtenhofer, Haoqi Fan, Kaiming He, Philipp Krahenbuhl, and Ross Girshick. Long-term feature banks for detailed video understanding. In *IEEE Conf. on CVPR*, pages 284-293, 2019.
8. A. M. Rahimi, et. al, "Toward Improving the Visual Characterization of Sport Activities With Abstracted Scene Graphs," Proceedings of the IEEE/CVF Conference on Computer Vision and Pattern Recognition (CVPR) Workshops, 2021, pp. 4500-4507
9. Ji, Jingwei and Krishna, Ranjay and Fei-Fei, Li and Niebles, Juan Carlos, "Action Genome: Actions as Compositions of Spatio-Temporal Scene Graphs," Proceedings of the IEEE/CVF Conference on Computer Vision and Pattern Recognition, pages 10236-10247, 2020.
10. Gunnar A. Sigurdsson, et al. "Hollywood in Homes: Crowdsourcing Data Collection for Activity Understanding." Proceedings of the IEEE/CVF European Conference on Computer Vision. 2016.
11. S. Wold, K. Esbensen and P. Geladi, "Principal Component Analysis," Chemometrics and Intelligent Systems, Vol. 2, Issues 1-3, August 1987, pp. 37-52.

(2) PRINCIPAL ASPECTS

Various embodiments of the invention include three "principal" aspects. The first is a system for action recognition error detection and correction using probabilistic signal temporal logic. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
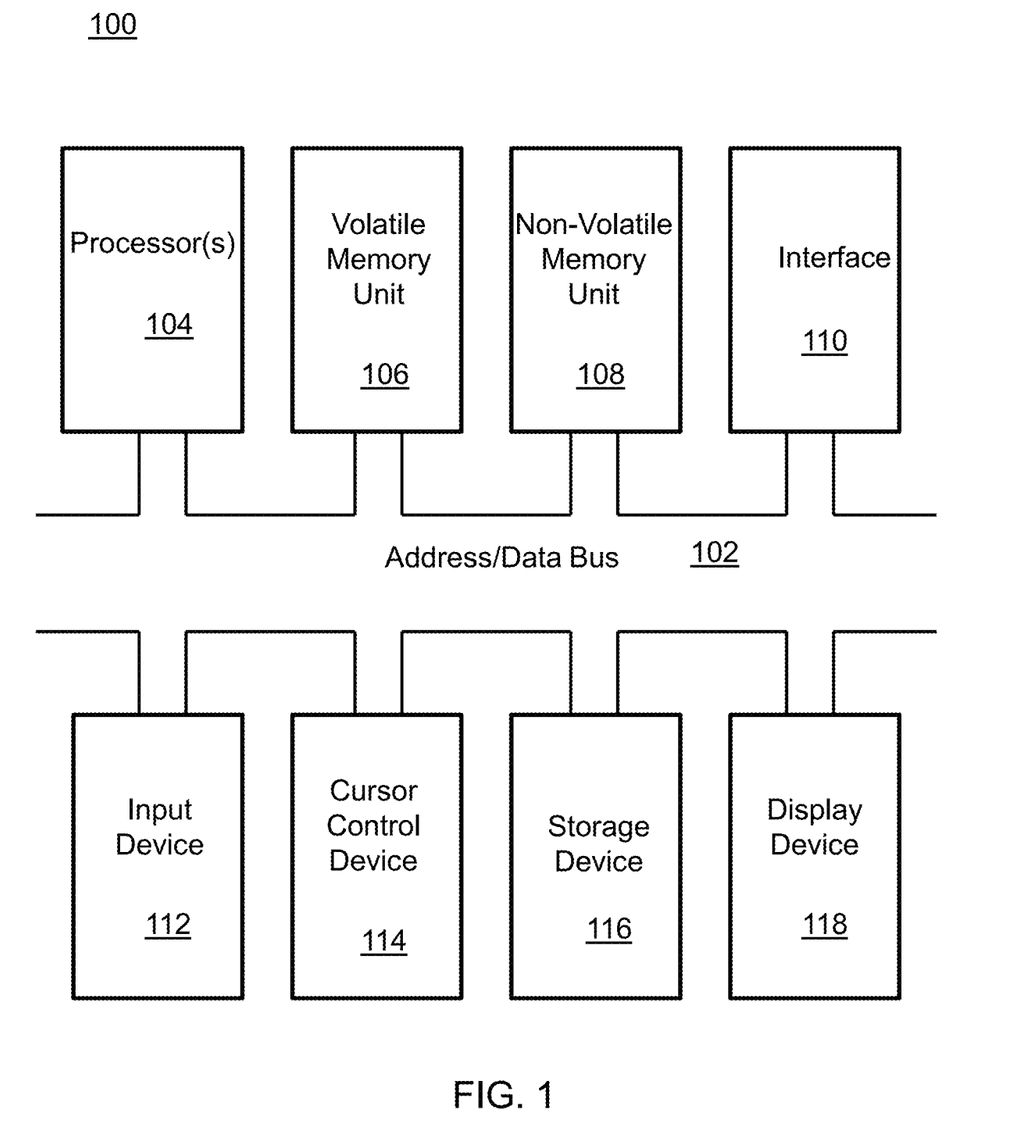
FIG. 1 is a block diagram depicting the components of a system according to various embodiments of the present invention.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein. In various aspects, the computer system 100 can be embodied in any device(s) that operates to perform the functions as described herein as applicable to the particular application, such as a desktop computer, a mobile or smart phone, a tablet computer, a computer embodied in a mobile platform, or any other device or devices that can individually and/or collectively execute the instructions to perform the related operations/processes.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA) or any other processing component operable for performing the relevant operations.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology. Further, one or more processors 104 (and/or associated devices, such as autonomous platforms) can be associated with one or more associated memories, where each associated memory is a non-transitory computer-readable medium. Each associated memory can be associated with a single processor 104 (or device), or a network of interacting processors 104 (or devices), such as a network of autonomous platforms (e.g., autonomous vehicles, robots).

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
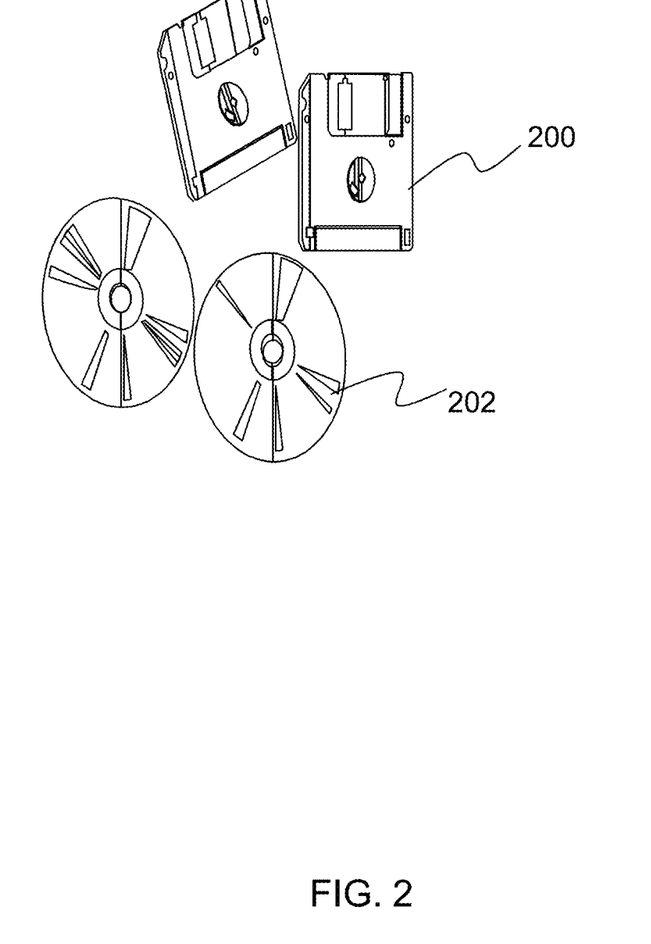
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

The present disclosure provides an improvement over existing action recognition systems through a unique error detection and adaptation method using probabilistic signal temporal logic (PSTL) based axioms. The method can be incorporated into state-of-the-art action recognition systems to improve the results and reduce false positives. It should be noted that any state-of-the-art action recognition system can be improved upon and incorporated into the present invention, non-limiting examples of which include Action Genome methods using spatial-temporal scene graphs (see Literature Reference No. 9), and so on.

First, from the state-of-the-art action recognition method, object-action-relation information is extracted. Next, during training, the extracted object-action-relation results are classified into true positive sets and false positive sets with the given ground truth. Accordingly, for each action, true positive statistics and false positive statistics are acquired. Those statistics are converted into the probabilistic signal temporal logic based axioms, and the generated axioms are used to filter out possible false positives during subsequent use (i.e., during test time). Through this process, the precision rates of action recognition are increased with only a minor impact on the recall rates.

The system and method as described provides several unique advantages and improvements over the prior art. For example, the action-based temporal logic is set up using true positive and false positive statistics. Additionally, using the action-based temporal logic, the system and method removes the false positive action and, in doing so, improves the precision rates of action recognition. As can be appreciated by those skilled in the art, the system and method has several applications. For example, the system can be used for estimating and correcting perception errors, especially for action recognition, with statistically formal verification. Thus, the process can be used in more robust autonomous driving systems, in autonomous unmanned systems, and also in more reliable action recognition during Intelligence, Surveillance and Reconnaissance (ISR) missions. Specific details are provided below.

(4) SPECIFIC DETAILS OF VARIOUS ASPECTS

Figure 3:
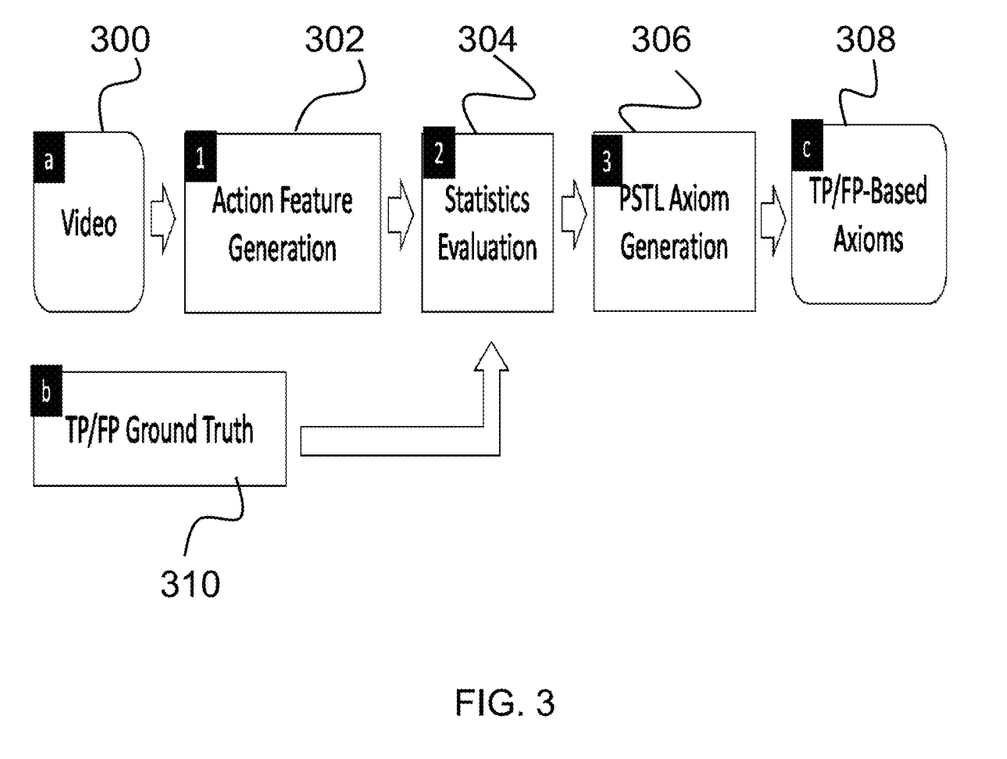
FIG. 3 is a flowchart depicting a process flow of an axiom training system according to various aspects of the present invention.
Figure 4:
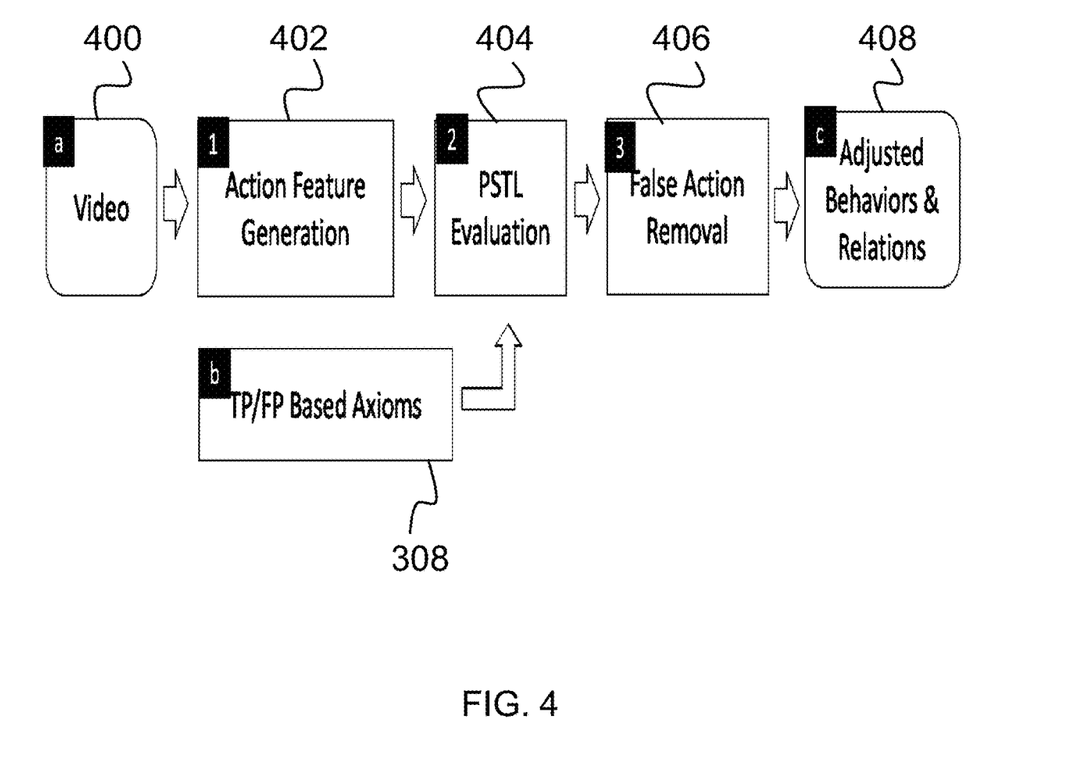
FIG. 4 is a flowchart depicting process flow of an action recognition error detection and correction system according to various embodiments of the present invention.

The overall structures of the described method and system are shown in FIGS. 3 and 4. First, FIG. 3 is a flow chart depicting the training process to generate true positive (TP)/false positive (FP) based axioms. In Step 1, the system receives a video stream 300 and generates action features/labels 302. The action features/labels are generated 302 using any suitable process, a non-limiting example of which is the action genome process as described in Literature Reference No. 6. Then with the given TP/FP ground truth 310 action labels in Block [b], TP/FP statistics are estimated 304 in Step 2. Those statistics and associated action labels are converted 306 into the probabilistic signal temporal logic (PTSL) based axioms in Step 3. The generated axioms 308 in Block [c] are used in the test process as shown in FIG. 4.

As shown in FIG. 4, during the test process, input videos 400 are used to generate action features/labels 402. Such action features/labels 402 can be generated using any suitable technique, including the same method as described above with respect to the training process. Using the trained TP/FP axioms 308, the system performs a PSTL evaluation 404, evaluating if the acquired action labels are separable from the false positive patterns in Step 2. For action labels classified as false positives, those action labels are removed 406 in Step 3, resulting in adjusted actions 408 (e.g., behaviors and relations) based on correct action classification. For example, adjusted actions 408 can be causing a device (e.g., autonomous vehicle) to perform a particular operation based on the true action classification.

Figure 5:
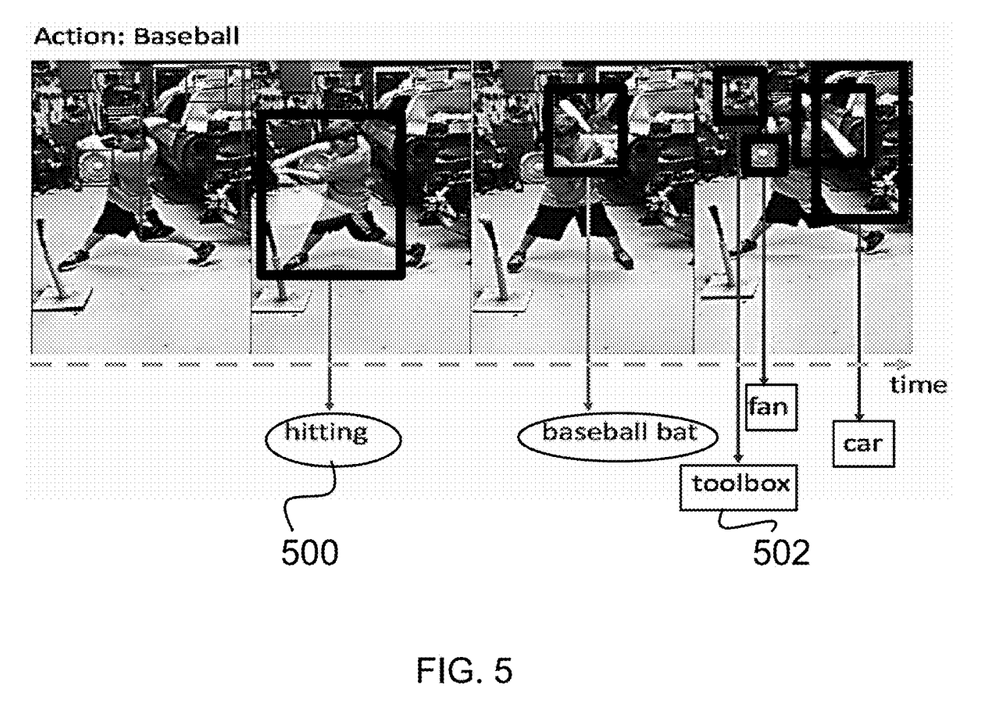
FIG. 5 is an illustration depicting a time series of images that include action description for both related and unrelated actions and objects.

The object relation features and corresponding action labels are generated to label an action as captured within the video stream. An effective video understanding model should be aware of semantic dependencies between hypothesized actions and the associated temporal context such as objects and their relations around the time that action is taking place. For instance and as shown in FIG. 5, if a person is swinging a baseball bat in a cluttered garage scene, the label "swinging a baseball bat" should ignore objects such as "chair", "car", or "fan" and rather encode "bat" and "sports ball" in the feature representation for that scene. FIG. 5 depicts a series of photos in a video sequence with action descriptions obtained for a better representation of the scene. The descriptions outlined in oval shapes 500 are related actions and objects, while the descriptions in rectangles 502 are unrelated.

Described below is the process of capturing of such dependencies between the actions performed by each person in the scene and the associated objects and relations while the actions are taking place. The details are also described in Literature Reference No. 8. Scene-graph feature bank generation is the initial stage of the process, where for each video frame f, all objects, $O=\{o_1, o_2, o_3, \ldots, o_m\}$, and all relations, $R=\{\{r_{11}, r_{12}, \ldots\}, \{r_{21}, r_{22}, \ldots\}\}$, are captured between all detected actors in the scene such that $r_{pq}$ is the relation between the $p^{th}$ object $o_p$ and the $q^{th}$ object $o_q$. Desirably, the system is programmed to select only the relations for which class of either the subject or the object in the subject-relation-object triplet is a person. Furthermore, the system provides the associated confidence probabilities for the prediction of each objects $\{s_1, s_2, \ldots\}$ and relations $\{s_{11}, s_{12}, \ldots, s_{21}, s_{22}, \ldots\}$. Given the confidences scores of the objects and relations associated with each person, a confidence map $C_{ij}=s_i*s_{ij}$ is constructed which captures the confidence for each combination of object relation for a given actor in the scene. Each matrix C is then flattened to generate each element of the scene graph feature bank $F_{SG}=[f_1, f_2, \ldots, f_T]$, where T is the total number of time steps while $f_t$ is the flattened C matrix for time t. So, given a video sequence V and a set of action labels L, the objective is to assign the label $l_t$ to each partial sequential clip $v_t$, (note that the classification could potentially be performed on a small duration of the videos as well). The classification framework trains an attention-based neural network that references the short-term information to the long-term information using a combination of three-dimensional (3D) convolutional neural network (CNN) features and the scene graph feature banks $F_{SG}$.

As noted above, action labels are converted into the probabilistic signal temporal logic (PSTL) based axioms.

The PSTL framework is described in detail in U.S. application Ser. No. 17/030,354 and published as Literature Reference No. 5, the entirety of which is incorporated herein by reference. The present disclosure expands on the PSTL framework by turning action label related probes into the PSTL axioms, and uses such axioms in the system to detect/correct action recognition errors.

During the PSTL-based axiom generation, from the input signals (i.e., probes from perceptions), two separate 'true positive' distributions and 'false positive' distributions are generated for each action label. For a detection/recognition, x, assume that a probe, f(x), is generated. By analyzing the values from true positives and also those from false positives, the system can obtain probabilistic distributions of true positives and false positives. The bounds for true positives and false positives are set from the meeting boundaries of the two distributions. Describing this relation in a mathematical form (axiom) with the probabilistic signal temporal logic, it becomes as follows:

$$\forall x, Pr(f(x,t_s:t_e) \leq BT \rightarrow y) \geq P_{TP} \rightarrow T$$

$$\forall x, Pr(f(x,t_s:t_e) \leq BF \rightarrow y) \geq P_{FP} \rightarrow F,$$

where $Pr(\cdot)$ is the predicate and y is the true detection or recognition. $t_s:t_e$ denotes the time sequence between $t_s$ and $t_e$, so $f(x,t_s:t_e)$ is the probe sequence in the time frame of $t_s:t_e$. Further, BT and BF are the distribution boundaries for true positives and false positives, respectively.

Depending on the probe dimensions, the probabilistic function can also be multi-dimensional. By integrating all the available axioms from x, the system provides a "multi-dimensional range" of the corresponding detection or recognition. When the probabilistic signal temporal logic is violated with more than a certain threshold, BT, in the true positive axiom, the corresponding perception process is designated as an erroneous process. On the other hand, when the signal is located within BF, this is also designated as an erroneous process.

If the process is applied to the feature banks (i.e., scene graph feature banks) mentioned above, an action sequence is divided into sequential clips. With the ground truth information, the true positive feature banks and the false positive feature banks are classified from the detected actions or detected action labels. The estimated statistics is set with the corresponding mean and standard deviation for each action label A: $(v_{TP}^A, \sigma_{TP}^A)$ for true positives and $(v_{FP}^A, \sigma_{FP}^A)$ for false positives. Then, for each sequential clip, the representative feature bank is defined as $v_t$. Finally, two probabilistic axioms are used for verifying that the action label A is correct (T) or erroneous (F) for a certain video (sequence of the clips), as follows:

$$Pr\{|v_t - v_{TP}^A| < \sigma_{TP}^A\} > P_{TP} \rightarrow T$$

$$Pr\{|v_t - v_{FP}^A| < \sigma_{FP}^A\} > P_{FP} \rightarrow F$$

where $P_{TP}$ is the probability threshold for the true positive set and $P_{FP}$ is the probability threshold for the false positive set. When those constraints are satisfied as true, the corresponding action label is accepted as recognized. If not, the action detection is discarded as an erroneous process.

Figure 6:
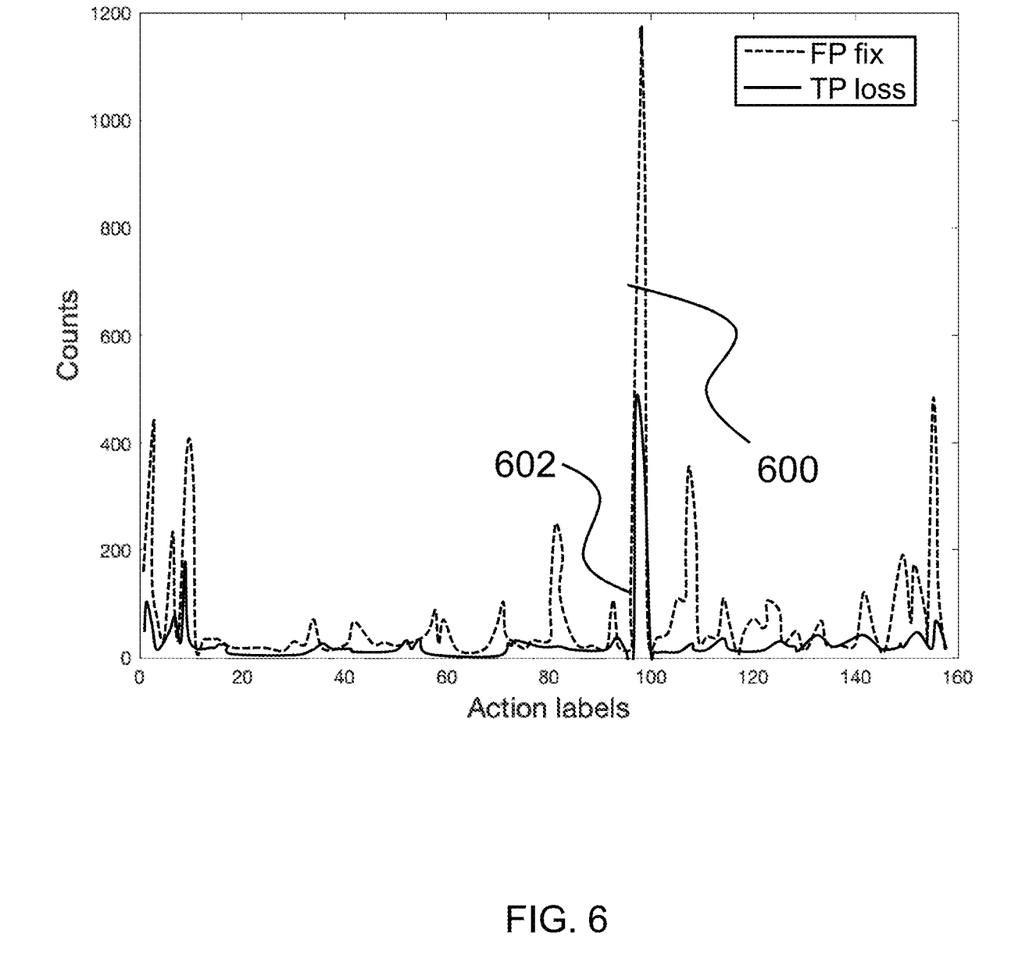
FIG. 6 is a graph depicting false positive (FP) removal versus true positive (TP) loss per action label.

In addition to working on raw signals, the method of the present disclosure also works with data compression with semantic abstraction, as well as providing benefits in improving precision rates. For example, the system of the present disclosure was tested on the Charades dataset (see Literature Reference No. 10). The statistics were acquired from 6000 videos, while the trained system was tested on 1108 videos. The input data included 151 object types with 51 relations, which generated a 7701x1 raw input vector. The total number of action labels was 157. FIG. 6 is a graph illustrating how many false positive actions are fixed 600 and how many true positive actions are missed 602 when compared with the ground truth. The graph demonstrates that the amount of false positive removals is much more than that of true positives.

Figure 7:
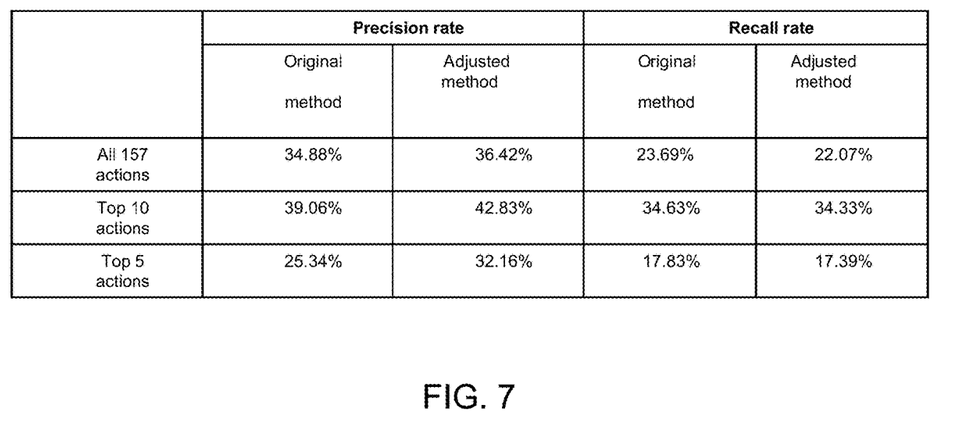
FIG. 7 is a table depicting precision/recall rate comparison.

For further understanding, FIG. 7 provides a table depicting how the precision and recall rates changed in experimental results using the described method. Overall, there is a noticeable precision rate improvement with a very small recall rate decrease. Since some actions do not provide a clear distinction between the true positive patterns and the false positive patterns, narrowing down with meaningful actions provides huge improvements. In this experiment, the top actions were selected from the detected actions which were highly close to false positives during training. The top five actions in the experiment were "taking off shoes," "dressing," "watching," "turning on a light," and "taking a book." An additional five actions were then included to provide for a total of top ten actions. The additional five actions were "sitting in a chair," "taking a medicine," "turning off a light," "reaching for and grabbing a picture," and "putting a dish." With the top ten actions, the precision was improved by 3.77% (9.67% when comparing to the original precision rate) while losing only 0.3% of the recall rate. With the top five actions, the precision improved by 6.82% (26.91% when comparing to the original precision rate) while losing only 0.44% of the recall rate.

Figure 8:
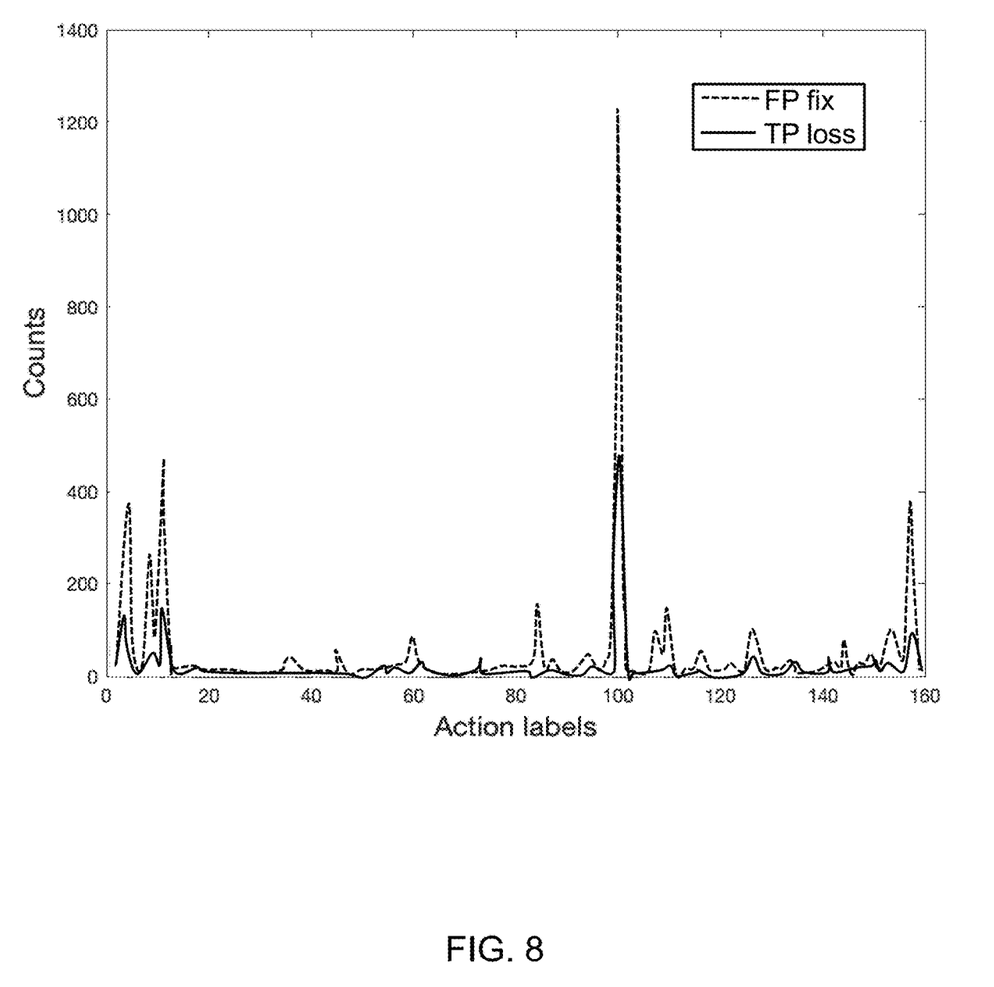
FIG. 8 is a graph depicting FP removal versus TP loss per action label with data abstraction using principal component analysis (PCA)
Figure 9:
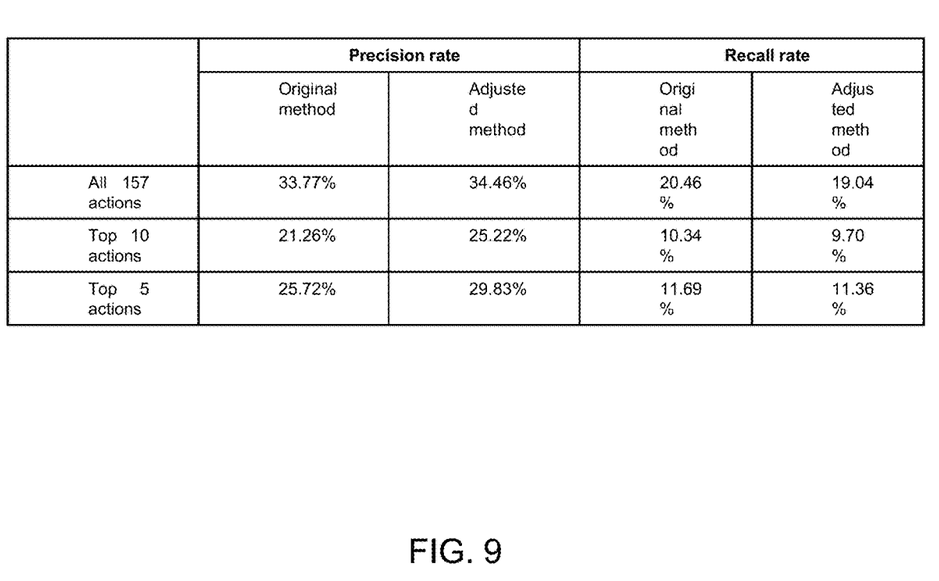
FIG. 9 is a table depicting precision/recall rate comparison with PCA.

Using the principal component analysis (PCA) process as described in Literature Reference No. 11, the 7701x1 action feature bank vectors were compressed into 1024x1 vectors. FIG. 8 is a graph depicting the benefits of false positive reduction over true positive loss. In comparing the graph of FIG. 8 with the raw feature vector results shown in FIG. 6, the patterns are quite similar to each other. Therefore, it is shown that the false positive reduction on the compressed data performs similarly to the raw feature vector processing. For further understanding, FIG. 9 is a table depicting how the precision and recall rates change with data abstraction using PCA. It is shown that the precision rates improve with a very small decrease in the recall rates. This pattern is particularly noticeable with the top ten actions, where the precision is improved by 3.96% (11.73% comparing to the original precision rate) while losing only 0.64% of the recall rate. Further, with the top five actions, the precision was improved by 4.11% (15.98% comparing to the original precision rate) while losing only 0.33% of the recall rate.

Figure 10:
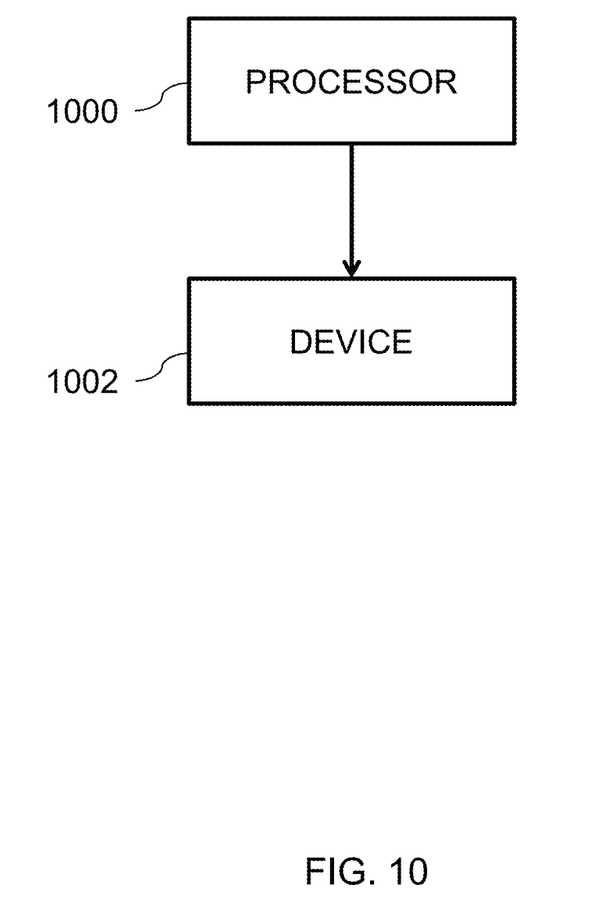
FIG. 10 is a block diagram depicting control of a device according to various embodiments.

As can be appreciated by those skilled in the art, the system as described herein can be implemented in a variety of applications that use object/action recognition. As shown in FIG. 10, such a system and its one or more processor(s) 1000 may be used to control a device 1002 (e.g., an autonomous vehicle or platform, a mobile device display, a virtual reality display, an augmented reality display, a computer monitor, a motor, a machine, a drone, a camera, etc.) based on identifying/classifying the action of the object. For example, in an autonomous vehicle setting, an object such as a pedestrian may be classified as "running" into the path of the vehicle. Thus, the true action classification is a classification that an object is about to intercept the path of the moving autonomous vehicle. In this aspect, the device 1002 may be controlled to cause the vehicle to move or otherwise initiate a physical action based on the classification of the action. For example, the vehicle may be caused to stop or turn to avoid a collision with the pedestrian that is performing an action of running into the path of the vehicle. Other appropriate responses may include one or more of a steering operation, a throttle operation to increase speed or to decrease speed, or a decision to maintain course and speed without change. The responses may be appropriate for avoiding a collision, improving travel speed, or improving efficiency.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for action recognition error detection and correction, the system comprising:
   one or more processors and a memory, the memory being a non-transitory computer-readable medium having executable instructions encoded thereon, such that upon execution of the instructions, the one or more processors perform operations of:
      training an action recognition system to generate true positive (TP)/false positive (FP) axioms;
      classifying one or more actions in a video sequence as true action classifications by using the TP/FP axioms to remove false action classifications; and
      controlling a device based on the true action classifications.

2. The system as set forth in claim 1, where training the action recognition system further comprises operations of:
   receiving a training video sequence;
   generating object action labels from object actions within the training video sequence;
   evaluating the object action labels using ground truth action labels to generate TP/FP statistics;
   converting the TP/FP statistics into probabilistic signal temporal logic (PTSL) based axioms; and
   generating the TP/FP axioms from the PTSL based axioms.

3. The system as set forth in claim 2, wherein classifying one or more actions in the video sequence as true action classifications further comprises operations of:
   receiving a video sequence;
   generating a set of action labels from the video sequence;
   evaluating the set of action labels based on the TP/FP axioms to identify false positive action labels;
   removing the false positive action labels from the set of action labels, leaving true action classifications.

4. The system as set forth in claim 3, wherein controlling the device based on the true action classifications includes causing an autonomous vehicle to initiate a maneuver to avoid a collision with an object.

5. The system as set forth in claim 4, wherein causing an autonomous vehicle to initiate a maneuver to avoid a collision with an object includes causing the autonomous vehicle to steer to avoid the collision.

6. The system as set forth in claim 1, wherein controlling the device based on the true action classifications includes causing an autonomous vehicle to initiate a maneuver to avoid a collision with an object.

7. The system as set forth in claim 6, wherein causing an autonomous vehicle to initiate a maneuver to avoid a collision with an object includes causing the autonomous vehicle to steer to avoid the collision.

8. A computer program product for action recognition error detection and correction, the computer program product comprising:
   a non-transitory computer-readable medium having executable instructions encoded thereon, such that upon execution of the instructions by one or more processors, the one or more processors perform operations of:
      training an action recognition system to generate true positive (TP)/false positive (FP) axioms;
      classifying one or more actions in a video sequence as true action classifications by using the TP/FP axioms to remove false action classifications; and
      controlling a device based on the true action classifications.

9. The computer program product as set forth in claim 8, where training the action recognition system further comprises operations of:
   receiving a training video sequence;
   generating object action labels from object actions within the training video sequence;
   evaluating the object action labels using ground truth action labels to generate TP/FP statistics;
   converting the TP/FP statistics into probabilistic signal temporal logic (PTSL) based axioms; and
   generating the TP/FP axioms from the PTSL based axioms.

10. The computer program product as set forth in claim 9, wherein classifying one or more actions in the video sequence as true action classifications further comprises operations of:
    receiving a video sequence;
    generating a set of action labels from the video sequence;
    evaluating the set of action labels based on the TP/FP axioms to identify false positive action labels;
    removing the false positive action labels from the set of action labels, leaving true action classifications.

11. The computer program product as set forth in claim 10, wherein controlling the device based on the true action classifications includes causing an autonomous vehicle to initiate a maneuver to avoid a collision with an object.

12. The computer program product as set forth in claim 10, wherein causing an autonomous vehicle to initiate a maneuver to avoid a collision with an object includes causing the autonomous vehicle to steer to avoid the collision.

13. The computer program product as set forth in claim 8, wherein controlling the device based on the true action classifications includes causing an autonomous vehicle to initiate a maneuver to avoid a collision with an object.

14. The computer program product as set forth in claim 13, wherein causing an autonomous vehicle to initiate a maneuver to avoid a collision with an object includes causing the autonomous vehicle to steer to avoid the collision.

15. A computer implemented method for action recognition error detection and correction, the method comprising an act of:

causing one or more processers to execute instructions encoded on a non-transitory computer-readable medium, such that upon execution, the one or more processors perform operations of:
- training an action recognition system to generate true positive (TP)/false positive (FP) axioms;
- classifying one or more actions in a video sequence as true action classifications by using the TP/FP axioms to remove false action classifications; and
- controlling a device based on the true action classifications.

16. The computer implemented method as set forth in claim 15, where training the action recognition system further comprises operations of:
- receiving a training video sequence;
- generating object action labels from object actions within the training video sequence;
- evaluating the object action labels using ground truth action labels to generate TP/FP statistics;
- converting the TP/FP statistics into probabilistic signal temporal logic (PTSL) based axioms; and
- generating the TP/FP axioms from the PTSL based axioms.

17. The computer implemented method as set forth in claim 16, wherein classifying one or more actions in the video sequence as true action classifications further comprises operations of:
- receiving a video sequence;
- generating a set of action labels from the video sequence;
- evaluating the set of action labels based on the TP/FP axioms to identify false positive action labels;
- removing the false positive action labels from the set of action labels, leaving true action classifications.

18. The computer implemented method as set forth in claim 15, wherein controlling the device based on the true action classifications includes causing an autonomous vehicle to initiate a maneuver to avoid a collision with an object.

19. The computer implemented method as set forth in claim 18, wherein causing an autonomous vehicle to initiate a maneuver to avoid a collision with an object includes causing the autonomous vehicle to steer to avoid the collision.

* * * * *